R. B. LANUM
Seed-Planter.

No. 42,781.  Patented May 17. 1864.

Witnesses:
J. W. Coombs.
Geo. W. Reed.

Inventor:
R. B. Lanum.
per Munn & Co.
Attorneys

UNITED STATES PATENT OFFICE.

R. B. LANUM, OF WASHINGTON, OHIO.

IMPROVEMENT IN CORN-PLANTERS.

Specification forming part of Letters Patent No. 42,781, dated May 17, 1864.

*To all whom it may concern:*

Be it known that I, R. B. LANUM, of Washington, in the county of Fayette and State of Ohio, have invented a new and Improved Seeding-Machine; and I do hereby declare that the following is a full, clear, and exact description of the same, reference being had to the accompanying drawings, making a part of this specification, in which—

Figure 1:
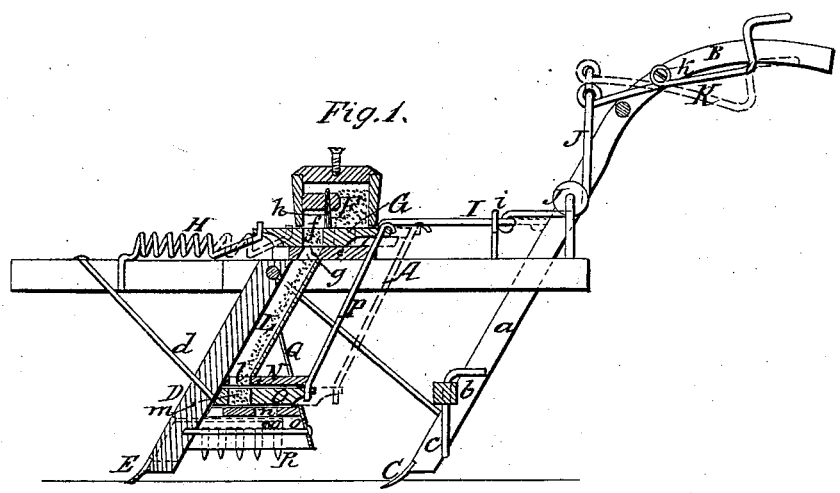
Figure 2:
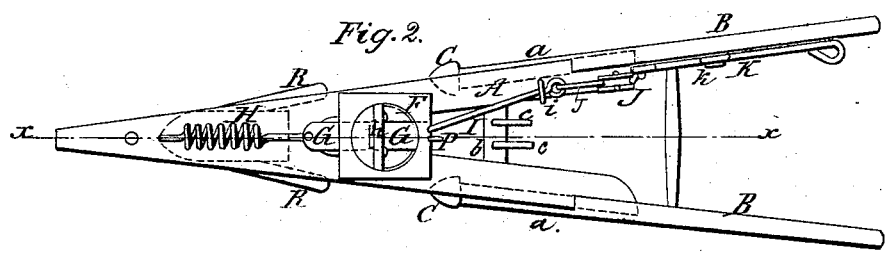

Figure 1 is a side sectional view of my invention, taken in the line *x x*, Fig. 2; Fig. 2, a plan or top view of the same.

Similar letters of reference indicate corresponding parts in the two figures.

To enable those skilled in the art to fully understand and construct my invention, I will proceed to describe it.

A represents the frame of the machine, which is of V form, and has two handles, B B, attached to its back end, said handles being curved at their upper ends, as usual, and extending below the frame A sufficiently far to form plow-standards *a a*, to which plows C, of shovel or other suitable form, are attached. The standards *a a*, near their lower ends, are connected by a cross-bar, *b*, through which teeth *c c*, two or more, pass, said teeth not extending down quite as far as the plows, as shown clearly in Fig. 1.

D is an inclined standard, which is attached to the frame A, a trifle in front of its center, and has a furrow-share, E, secured to its lower end. The standard D is braced by a rod, *d*, from the frame A.

On the frame A there is placed a seed-box, F, having within it a slide, G, which works over the bottom *e* of the seed-box. The slide G has a hole, *f*, made through it, and a similar hole, *g*, is made in the bottom *e* of the seed-box. Within the seed-box there is also placed a cut-off brush, *h*, and to the front end of the slide G there is attached a spiral spring, H, which has a tendency to keep the slide G drawn forward to its fullest extent, so that the holes *f g* of the slide G and bottom *e* will register or be in line with each other, as shown in Fig. 1.

I is a rod, which is attached to the back end of the slide G, and works through a guide, *i*, on the frame A. To the back end of this rod I there is attached a cord, J, which passes underneath a pulley, *j*, at one side of the back part of the frame A, and, extending upward, is attached to the front end of a lever, K, which is secured by a fulcrum-pin, *k*, to the right handle B of the machine.

L is a tube, which is attached to the rear side of the standard D, and has its upper end in line with the hole *g* in the bottom *e* of the seed-box. The lower end of the tube L is in line with a hole, *l*, in a box, N, which is attached to the back of the standard D. Within this box N there is placed a horizontal slide, O, which is provided with a hole, *m*, and the bottom of the box N, underneath the slide O, also has a hole, *n*, made in it, the hole *n* being out of line with the hole *l* in the upper part of the box. The back end of the slide O is connected with the slide G by a rod, P, and the slide O is consequently acted upon and drawn forward by the same spring, H, which draws forward the slide G. When the slide O is in a forward position its hole *m* is in line with the upper hole, *l*, fo the box N, and consequently out of line with the lower hole, *n*, of said box. The box N is inclosed within a metal case or jacket, Q, which projects down a trifle below the box N, and in the lower part of said jacket there are fitted two horizontal cross-wires, *o o*, which intersect each other directly underneath the lower hole, *n*, of the box N.

To the standard D, at each side, there is attached obliquely a rake, R. These rakes have their teeth extending down a trifle below the lower end of the jacket Q, as shown in Fig. 1.

The operation is as follows: The seed-box F is supplied with a requisite quantity of seed, and as the machine is drawn along the share E makes the furrow to receive the seed, and the operator or driver, who has hold of the handles B B, at suitable intervals depresses the outer end of the lever K, thereby raising the front end of said lever, and drawing back through the medium of the cord J and rod I the slide G, so that the hole *f* of the latter will be at the back part of the seed-box and behind the cut-off brush *h*, and will become filled with seed. When the operator releases the lever K the spring H draws the slide G forward underneath and in front of the cut-off brush *h*, and the seed in *f* falls into the tube L, and is conveyed thereby through the hole *l* in the upper part of the box N into the hole *m* in the slide O, and when the slides G and O are again drawn back by actuating the lever K the seed in *m* falls through the hole *n* in the bottom of box N and into the furrow made by share E, the rods *o o* scattering the seed, and the plows C C covering it. The rakes R R stir up or lighten the soil at each side of the drill, while the teeth *c c* lower the soil on the top of the drill and render the soil light and friable, so as to favor the rapid germination of the seed and the subsequent growth of the plants.

By the arrangement of the lever K, cord J, and rod I, I obtain a horizontal and straight pull on the slide G, and said slide is allowed to operate with but little friction, and with certainty, not being liable to catch or stick in its operation. This is an important feature in this class of seeding-machines. By having the two slides G O connected and arranged, as shown, so as to work simultaneously in the same direction and still discharge the seed alternately a very simple and efficient mechanism is obtained for the purpose, and are not liable to get out of repair or become deranged by use. No intermediate levers are required between the two slides—a connecting-rod, P, only.

I do not claim broadly the employment or use of the seed-slides G O operated by hand for distributing or planting seed, for that has been previously used; but,

Having thus described my invention, what I do claim as new, and desire to secure by Letters Patent, is—

The lever K, cord J, rod I, and spring H, in combination with the two seed-slides G O, rod P, tube L, and box N, all arranged to operate in the manner and for the purpose herein set forth.

R. B. LANUM.

Witnesses:
 DARIUS WATERS,
 Z W. HEOGLEN.